J. B. BOSTIAN.
RUNNING GEAR FOR AUTOMOBILES.
APPLICATION FILED MAR. 19, 1910.

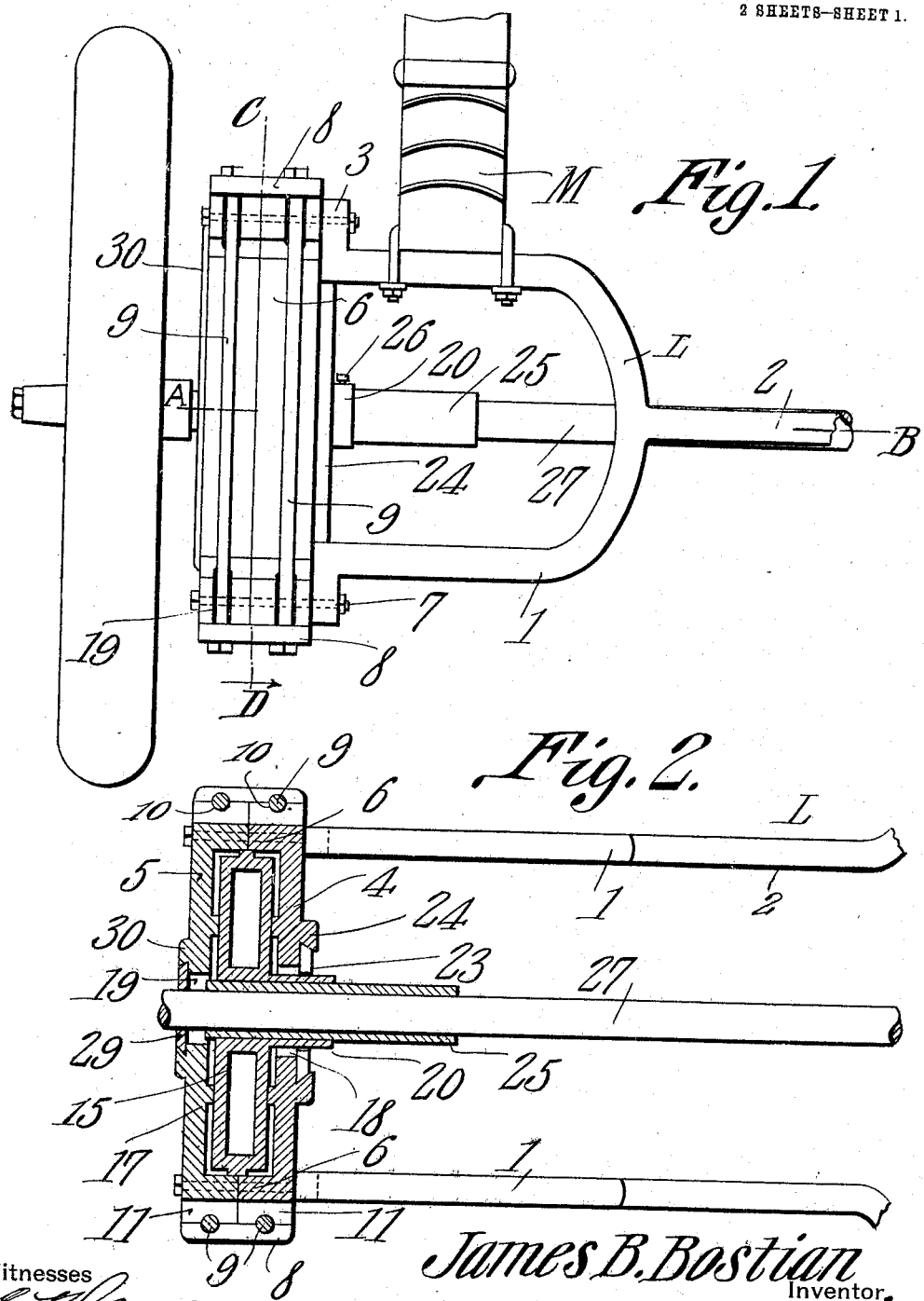

980,589.

Patented Jan. 3, 1911.
2 SHEETS—SHEET 2.

Witnesses

James B. Bostian.
Inventor by C. A. Snow & Co.
Attorneys

UNITED STATES PATENT OFFICE.

JAMES B. BOSTIAN, OF GRAND LEDGE, MICHIGAN.

RUNNING-GEAR FOR AUTOMOBILES.

980,589. Specification of Letters Patent. Patented Jan. 3, 1911.

Application filed March 19, 1910. Serial No. 550,311.

*To all whom it may concern:*

Be it known that I, JAMES B. BOSTIAN, a citizen of the United States, residing at Grand Ledge, in the county of Eaton and State of Michigan, have invented a new and useful Running-Gear for Automobiles, of which the following is a specification.

This invention relates to running gears for motor vehicles and its object is to provide floating axles which are mounted in a novel manner whereby either wheel supporting an axle may be raised independently of the other wheel carrying said axle when, for example, the said wheel passes over an unyielding obstruction, such elevation of the wheel failing however to produce a corresponding elevation of the adjoining portion of the vehicle frame or chassis.

A further object is to provide axle bearings which are movably mounted within guides provided therefor, the movements of the bearings being under the control of springs.

With these and other objects in view the invention consists in certain novel details of construction and combinations of parts hereinafter more fully described and pointed out in the claims.

In the accompanying drawings the preferred form of the invention has been shown.

Figure 4:
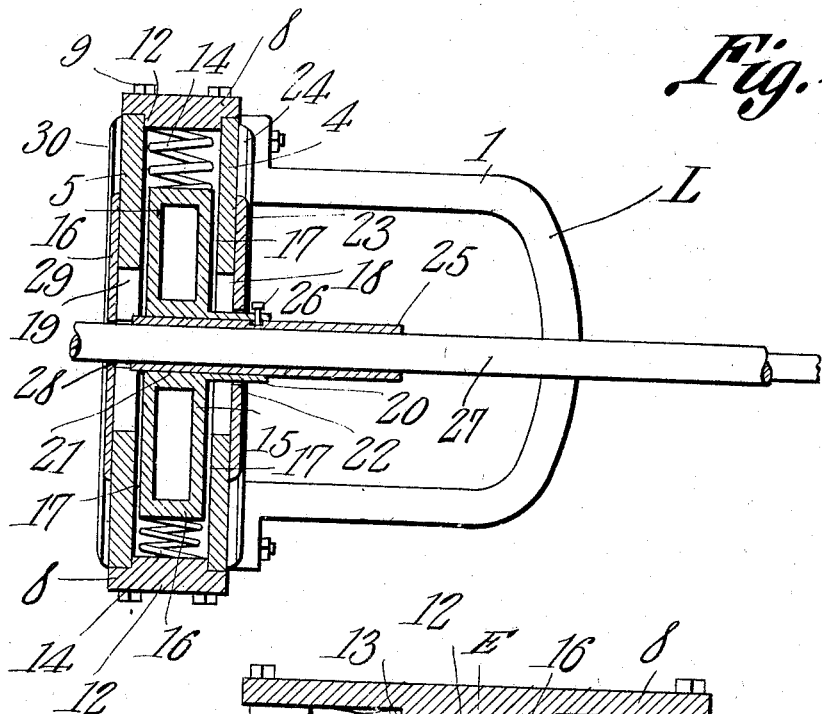
Figure 3:
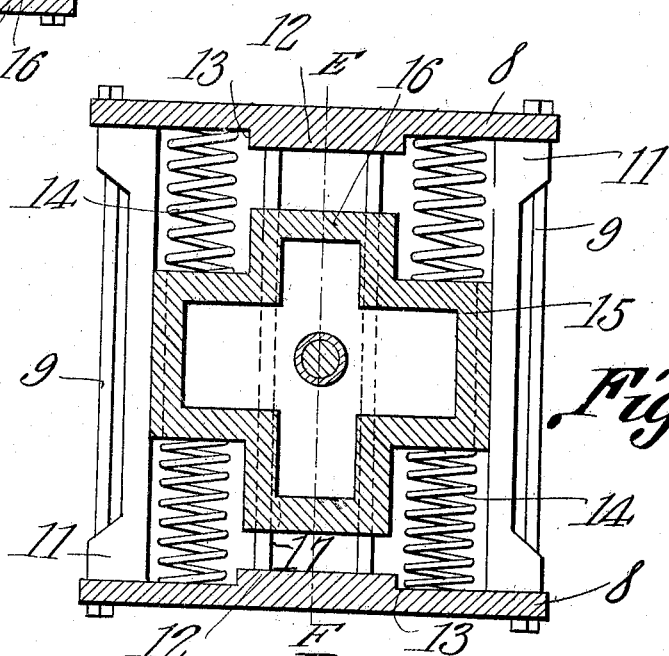

In said drawings, Figure 1 is a front elevation of a portion of the drive axle and its bearing. Fig. 2 is a section on line A—B Fig. 1. Fig. 3 is a section on line C—D Fig. 1. Fig. 4 is a section on line E—F Fig. 3.

Referring to the figures by characters of reference L designates the fixed axle located at the rear of the vehicle, said axle consisting of front and rear members each of which is made up of end yokes 1 and a connecting bar 2. The two members of this fixed axle are placed one in front of the other and with the yokes 1 thus arranged in pairs, one pair being located adjacent each side of the vehicle. These yokes are designed to be secured to the springs M supporting the chassis and each of the yokes is provided at its ends with oppositely extending feet 3 adapted to be bolted or otherwise secured to one of the guide boxes of the running gear. Each of these boxes consists of an inner plate 4 and an outer plate 5, the two plates being provided along their vertical edges with flanges 6 through which bolts 7 are extended, these bolts being preferably utilized for the purpose of securing the feet 3 to the inner plate 4 and also serving to bind the opposed flanges 6 together so as to form a guide box. Cap plates 8 serve to close the upper and lower ends of the box and are held in place by means of tie bolts 9 extending longitudinally along the sides of the box and seated within notches 10 formed in outstanding lugs or ears 11 which are arranged upon the outer faces of the flange 6 adjacent their ends. Each of the cap plates is preferably provided, on its inner face, with an extension 12 extending between the plates 4 and 5 but spaced from the flanges 6 so as to form recesses 13 constituting seats for springs 14. These springs are arranged in pairs, one pair bearing against each of the cap plates 8. A slide or bearing block 15 is mounted between the plates 4 and 5 and extends between the opposed springs 14, said bearing block being provided at each end with an extension 16 adapted to project between the adjoining springs 14, the said extension, as well as the adjoining extension 12, thus serving to prevent lateral displacement of the springs after the parts have once been assembled. Side bearing cleats 17 may be formed upon the inner faces of the plates 4 and 5 and additional bearing cleats may be formed upon the front and back faces of the blocks 15, as indicated in Fig. 2, thus reducing wear to the minimum. A longitudinal slot 18 is formed within the central portion of the plate 4 and another longitudinal slot 19 is formed within the central portion of the outer plate 5. A boss 20 is formed upon one side of the block 15 at the center thereof and extending through this boss and through the center of the block 15 is a bore 21. The boss 20 extends through the slot 18 and into an opening 22 formed in a slide 23 which is mounted between guide cleats 24 formed on or secured to the outer face of the plate 4. This slide 23 is designed to move longitudinally upon the plate 4 and the slot 18 is of such length as to permit a limited movement of the boss 20 in the direction of the length of the slot. A sleeve 25 is seated within the bore of boss 20 and is adapted to be detachably held therein by means of a locking screw 26 or the like, one end of this sleeve projecting a desired distance into the slot 19. The sleeve 25 constitutes a bearing for the main axle 27 of the vehicle, this axle being extended at its outer end, through an opening 28 formed in a slide 29 which is mounted between cleats 30 secured to or formed upon the outer face of the plate 5. This slide is designed to move longitudinally.

It is to be understood that the opposed springs 14 serve to hold the block 15 normally in a predetermined position and with the main axle 27 centered within the slots 18 and 19. Should the wheel upon one end of the axle 27 be suddenly elevated, as when passing over a small projection at a high speed, it will not cause a corresponding elevation of the fixed axle L but will, instead, cause the block 15 to slide upwardly within the box formed by the plates 4 and 5, the slides 23 and 29 being shifted upwardly with the axle 27 and such upward movement being retarded by the upper spring 14. It will be seen that the only wear within the box will occur at those points where the bearing cleats 17 contact therewith.

It will be seen that by arranging the parts in the manner described a "floating" axle may be provided, the bearings thereon being simple and durable in construction and readily accessible for the purpose of making repairs.

It is of course to be understood that the fixed axle L is adapted to support the transmission gearing, this gearing being preferably mounted on the connecting bars 2. Practically the same principle may be followed in mounting the front wheels of the vehicle.

What is claimed is:—

1. An axle including opposed members having terminal yokes, a sectional box fixedly connected to the yokes at one end of the members, and a spring supported bearing block movably mounted within the box, said box having axle-receiving openings in opposite walls thereof, the axle being journaled in the blocks.

2. Running gear for vehicles including a non-revoluble axle composed of spaced sections, a sectional box secured to the axle sections, a resiliently mounted block carried by the box, and a revoluble axle journaled within the block.

3. Running gear for vehicles including a non-revoluble axle made up of spaced sections, each section including a yoke, a sectional box secured to the yokes on the axle sections, means for detachably securing the box sections together, a resiliently supported block mounted within the box, and a revoluble axle journaled within the block and extending beyond the box.

4. Running gear for vehicles, including a fixed axle made up of spaced sections, each section having a yoke, a sectional box secured to and fixed relative to the yokes, a bearing block slidably mounted within the box, elastic means above and below the block, and housed within the box for controlling the movement of the block, and a revoluble axle movable with the block and extending beyond the box.

In testimony that I claim the foregoing as my own, I have hereto affixed my signature in the presence of two witnesses.

JAMES B. BOSTIAN.

Witnesses:
JOHN M. GOULD,
A. W. SEKELL.